US012755895B2

(12) United States Patent
Hwang et al.

(10) Patent No.: US 12,755,895 B2
(45) Date of Patent: Oct. 6, 2026

(54) COIL DEVICE

(71) Applicant: TDK CORPORATION, Tokyo (JP)

(72) Inventors: Kiho Hwang, Tokyo (JP); Satoshi Shinbo, Tokyo (JP); Toshiyuki Horikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 972 days.

(21) Appl. No.: 18/077,729

(22) Filed: Dec. 8, 2022

(65) Prior Publication Data

US 2023/0187124 A1 Jun. 15, 2023

(30) Foreign Application Priority Data

Dec. 9, 2021 (JP) ................................ 2021-200043

(51) Int. Cl.

*H01F 27/24* (2006.01)
*H01F 27/32* (2006.01)
*H01F 38/08* (2006.01)

(52) U.S. Cl.

CPC ........... *H01F 27/325* (2013.01); *H01F 27/24* (2013.01); *H01F 38/08* (2013.01)

(58) Field of Classification Search

CPC ........ H01F 27/325; H01F 27/24; H01F 38/08; H01F 3/14; H01F 27/28; H01F 27/306; H01F 27/346

USPC ...................... 336/65, 83, 90, 196, 198, 232

See application file for complete search history.

(56) References Cited

U.S. PATENT DOCUMENTS

| | | | | | |
|---|---|---|---|---|---|
| 5,053,738 | A * | 10/1991 | Sato | H01F 38/10 336/215 |
| 11,380,473 | B2 * | 7/2022 | Ebner | H01F 27/26 |
| 2009/0289751 | A1 * | 11/2009 | Nagano | H02M 3/1584 336/221 |
| 2013/0154787 | A1 | 6/2013 | Maeda et al. | |
| 2022/0084741 | A1 | 3/2022 | Ichihashi et al. | |

FOREIGN PATENT DOCUMENTS

| | | | | | |
|---|---|---|---|---|---|
| JP | 2005-158927 | A | 6/2005 | |
| JP | 2010-263078 | A | 11/2010 | |
| JP | 2013-080881 | A | 5/2013 | |
| JP | 2019-047105 | A | 3/2019 | |
| JP | 2020-194817 | A | 12/2020 | |
| JP | 7715614 | B2 | 7/2025 | |
| KR | 101762559 | B1 * | 7/2017 | H01F 27/24 |

OTHER PUBLICATIONS

Translation of Feb. 3, 2026 Office Action issued in Japanese Application No. 2025-091160.

* cited by examiner

*Primary Examiner* — Tuyen T Nguyen
(74) *Attorney, Agent, or Firm* — Oliff PLC

(57) ABSTRACT

A coil device including a bobbin, a first wire having a first coil part wound around the bobbin, a second wire having a second coil part wound around the bobbin, and cores and installed to the bobbin. Main inner leg sections and of the cores and are arranged at the inside of the first coil part and the second coil part. First sub-inner leg sections and of the cores and are arranged at the inside of the first coil part and an outside of the second coil part. Second sub-inner leg sections and of the cores and are arranged at the inside of the second coil part and at an outside of the first coil part.

15 Claims, 14 Drawing Sheets

COIL DEVICE

TECHNICAL FIELD

The present invention relates to a coil device, for example, suitably used as a leakage transformer.

BACKGROUND

A leakage transformer is used as a combined transformer which has a function as a choke coil in addition to a function as a transformer. As for the leakage transformer, leakage flux functions as a choke coil, thus a structure of the choke coil can be omitted, and it contributes to downsizing of the transformer.

Patent Document 1 discloses a horizontal leakage transformer which arranges a secondary coil in a primary coil, and also discloses a vertical leakage transformer which vertically arranges a primary coil and a secondary coil along the same axis.

However, neither of the transformers were able to secure leakage flux unless a certain distance was provided between the primary coil and the secondary coil, which made it difficult of downsizing the transformer.

[Patent Document 1] JP Patent Application Laid Open No. 2005-158927

SUMMARY

The present invention is achieved in view of such circumstances, and the object is to provide a coil device capable of securing leakage flux in addition to achieve a compact coil device.

In order to achieve the above object, the coil device according to the present embodiment includes a bobbin, a first wire having a first coil part wound around the bobbin, a second wire having a second coil part wound around the bobbin, and a core installed to the bobbin, wherein;

the core includes a base part extending in a first axis direction, a main inner leg section arranged roughly on a center of the base part in the first axis direction, a first sub-inner leg section on the base part arranged at one side to the main inner leg section in the first axis direction, and a second sub-inner leg section on the base part arranged at an other side to the main inner leg section in the first axis direction; in which the main inner leg section is arranged at an inside of the first coil part and the second coil part, the first sub-inner leg section is arranged at the inside of the first coil part and an outside of the second coil part, and the second sub-inner leg section is arranged at the inside of the second coil part and at an outside of the first coil part.

By configuring as such, even when the coils are close to each other, leakage flux is generated via the sub-inner leg section, thus leakage flux is secured and enables to achieve a compact coil device. Also, by configuring as such, AC resistance is suppressed, and a copper loss can be suppressed.

Further, according to this configuration, a proportion of number of turns of primary coil and secondary coil can be easily adjusted. For example, in case of a conventional horizontal leakage transformer, when a proportion of number of turns of each wire is 1:1, and the inductance of the primary coil and the inductance of the secondary coil were set about the same, then it was difficult to secure the leakage flux while maintaining a compact transformer. However, by taking above-mentioned configuration, leakage flux can be easily secured even when a proportion of number of turns of each coil is 1:1 and also even when the inductance of each coil is about the same.

Preferably, the core may include a first outer leg section and a second outer leg section arranged on the base part, in which the first sub-inner leg section may be arranged between the first outer leg section and the main inner leg section, the second sub-inner leg section may be arranged between the second outer leg section and the main inner leg section, the first outer leg section may be arranged at the outside of the first coil part, and the second outer leg section may be arranged at the outside of the second coil part.

By taking such configuration, each coil part can be provided between the outer leg sections, and a compact coil device can be achieved.

Preferably, the core may include a core first portion at least including a first base part which is one part of the base part, and a core second portion at least including a second base part which is another part of the base part and is approximately parallel to the first base part, and the first coil part and the second coil part may be arranged along a direction of a winding axis of the first coil part and held between the core first portion and the core second portion.

By taking such configuration, each coil part can be provided between the outer leg sections, and a compact coil device can be achieved.

Preferably, the bobbin may include a first winding part to which the first coil part is wound around, a second winding part to which the second coil part is wound around, and a winding part separation flange separating the first winding part and the second winding part, in which the first winding part is provided with a first main opening for arranging the main inner leg section and a first sub-opening for arranging the first sub-inner leg section, the second winding part is provided with a second main opening for arranging the main inner leg section and a second sub-opening for arranging the second sub-inner leg section, and the first main opening and the second main opening are connected.

By taking such configuration, the first wire and the second wire can be insulated, and each wire and the core can be securely insulated.

Preferably, a cross sectional area of the main inner leg section may be about the same as a total of a cross sectional area of the first outer leg section and a cross sectional area of the second outer leg section. Preferably, a cross sectional area of the main inner leg section may be larger than a cross sectional area of the first sub-inner leg section.

Preferably, the core may be symmetric across a symmetric axis perpendicular to the first axis direction By taking such configuration, a proportion of number of turns between the first coil part and the second coil part can be 1:1, and further each coil can easily have about the same inductance.

Note that, the first sub-inner leg section may have a first gap. The leakage flux can be adjusted by the first gap.

Also, the main inner leg section may have a second gap, and a length of the first gap is longer than a length of the second gap. Braking and chipping of the leg sections can be prevented by these gaps.

Preferably, the core first portion and the core second portion may have symmetrical structures along the winding axis of the first coil part. Note that, the core may be separated along a second axis perpendicular to the first axis and the winding axis of the first coil part.

BRIEF DESCRIPTION OF THE SEVERAL VIEWS OF THE DRAWING(S)

DETAILED DESCRIPTION

In below, the present invention is described based on embodiments shown in the figures.

Figure 1:
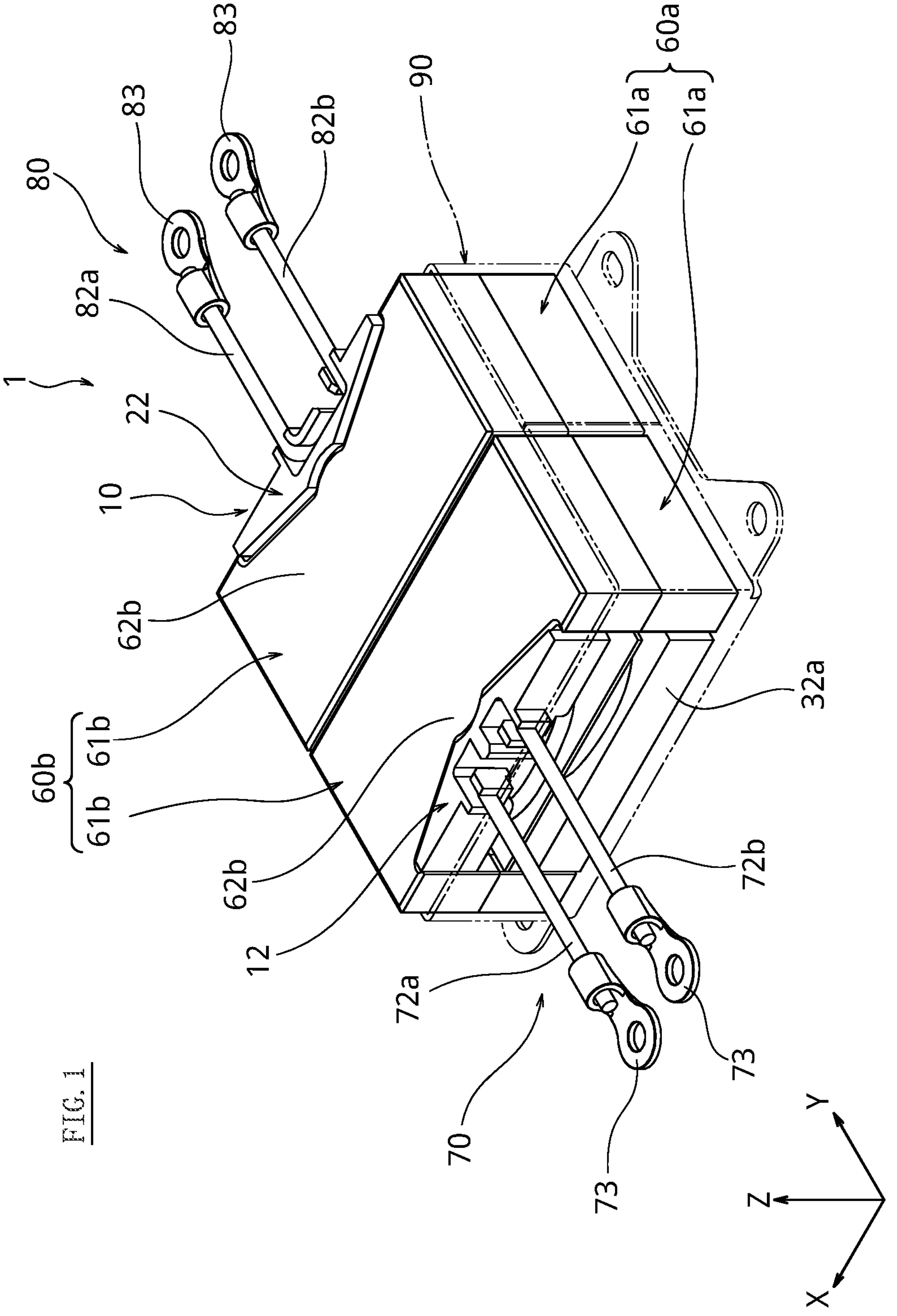
FIG. 1 is a schematic perspective figure showing a configuration of a coil device according to one embodiment of the present invention.

As shown in FIG. 1, a transformer 1 as a coil device according to the present embodiment is used, for example, as a leakage transformer, and it is used for an in-vehicle charger for electric vehicle, a general-purpose charger, and the like.

As shown in FIG. 1, the transformer 1 includes a first wire 70 and a second wire 80, a bobbin 10 to which the wires are wound around, cores **60*a* and 60*b* holding the bobbin 10 along Z-axis, and a case 90 where these are placed inside. Note that, in the figures, X-axis, Y-axis, and Z-axis are perpendicular to each other, and Z-axis corresponds to a height (thickness) of the transformer 1. In the present embodiment, a lower side in Z-axis of the transformer 1 is a mounting face of the transformer 1. Also, X-axis matches the direction that a base part 62*b* of the core 60*b* is extending. Further, Y-axis matches the direction that separated cores 61*b* and 61*b* of the core 60*b*** are aligned.

Also, in the present specification, the direction that the core **60*b* is arranged may be referred as "an upper side", and the direction that the core 60*a* is arranged may be referred as "a lower side". Also, in the present specification, the side closer to the center of the transformer 1 may be referred as "inside", and the side away from the center of the transformer 1** may be referred as "outside".

Figure 7:
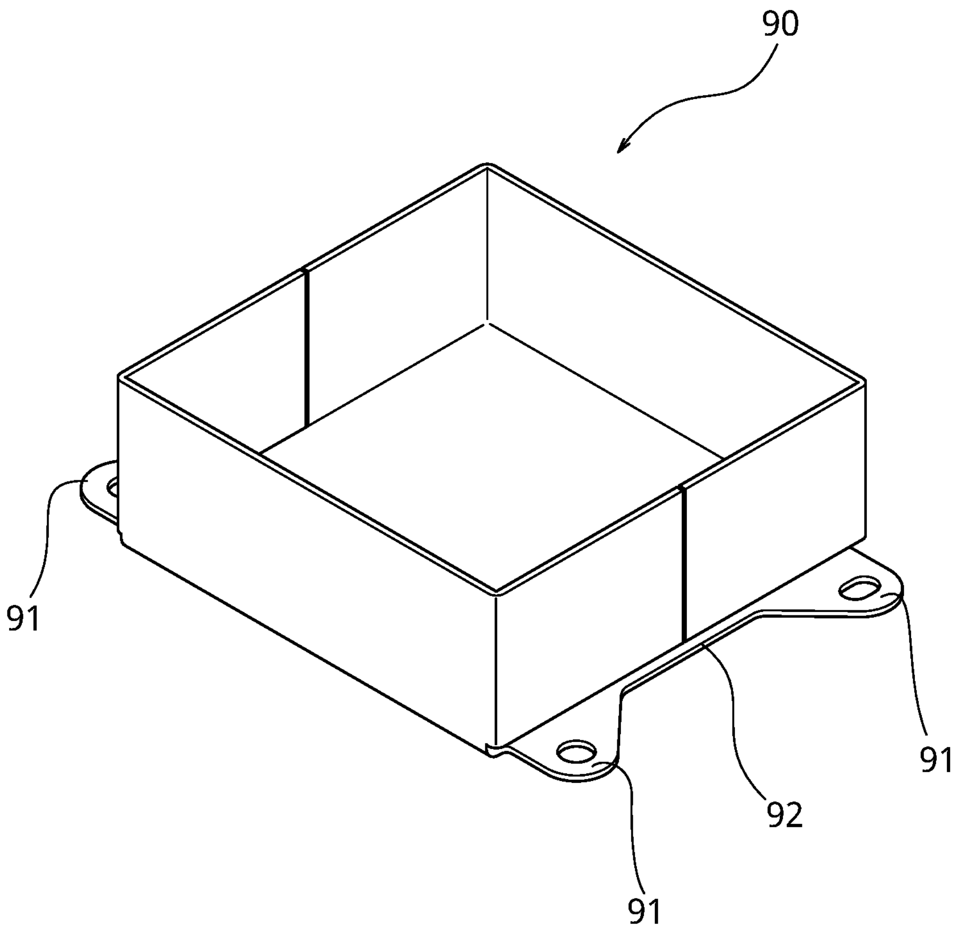
FIG. 7 is a schematic perspective diagram showing a configuration of a case of the coil device according to FIG. 1.

In the present embodiment, as shown in FIG. 7, the case 90 is formed of a plate-like member. The upper side in Z-axis of the case 90 is opened, and at the lower side in Z-axis direction, a base plate 92 is formed. At four corners of the base plate 91, fixing parts 92 are formed. The case 90 may be preferably made of metals such as aluminum, copper, iron, and the like which have an excellent heat dissipation property; and it may also be made of PPS, PET, PBT, and the like. The base plate 92 contacts with a lower end face in Z-axis direction of the core **60*a*, thus the base plate 92 may preferably be made of a material with excellent heat dissipation property. At the lower side of the case 90, a cooling device such as a cooling pipe, cooling fin, and the like may be installed via the base plate 92** or may be installed directly.

The case 90 may be filled with a heat dissipation resin. The heat dissipation resin is not particularly limited, and for example, a resin with excellent heat dissipation property such as a thermal conductivity of 0.5 to 5 W/m·K, preferably 1 to 3 W/m·K may be preferably used. As a resin with excellent heat dissipation property, for example, a silicone-based resin, a urethane-based resin, an epoxy-based resin, and the like may be mentioned.

Also, when the cores **60*a* and 60*b* or the bobbin 10 are deformed due to heat, the heat dissipation resin of the present embodiment absorbs such deformation, and preferably the cores 60*a* and 60*b*** may not receive excess stress excess stress. As such resin, a potting resin may be mentioned.

As shown in FIG. 1, in the present embodiment, the core **60*a* has a base part 62*a* which becomes a core first portion shown in FIG. 5**A.

The base part **62*a* is arranged at lower side in Z-axis direction of the bobbin 10. The core 60*b* has the base part 62*b* which becomes a core second portion. The base part 62*b* is arranged at the upper side in Z-axis direction of the bobbin 10. In the present embodiment, a material of each core 60*a* and 60*b*** is not particularly limited, and it may be a metal, a soft magnetic material such as ferrite, and the like.

Figure 5A:
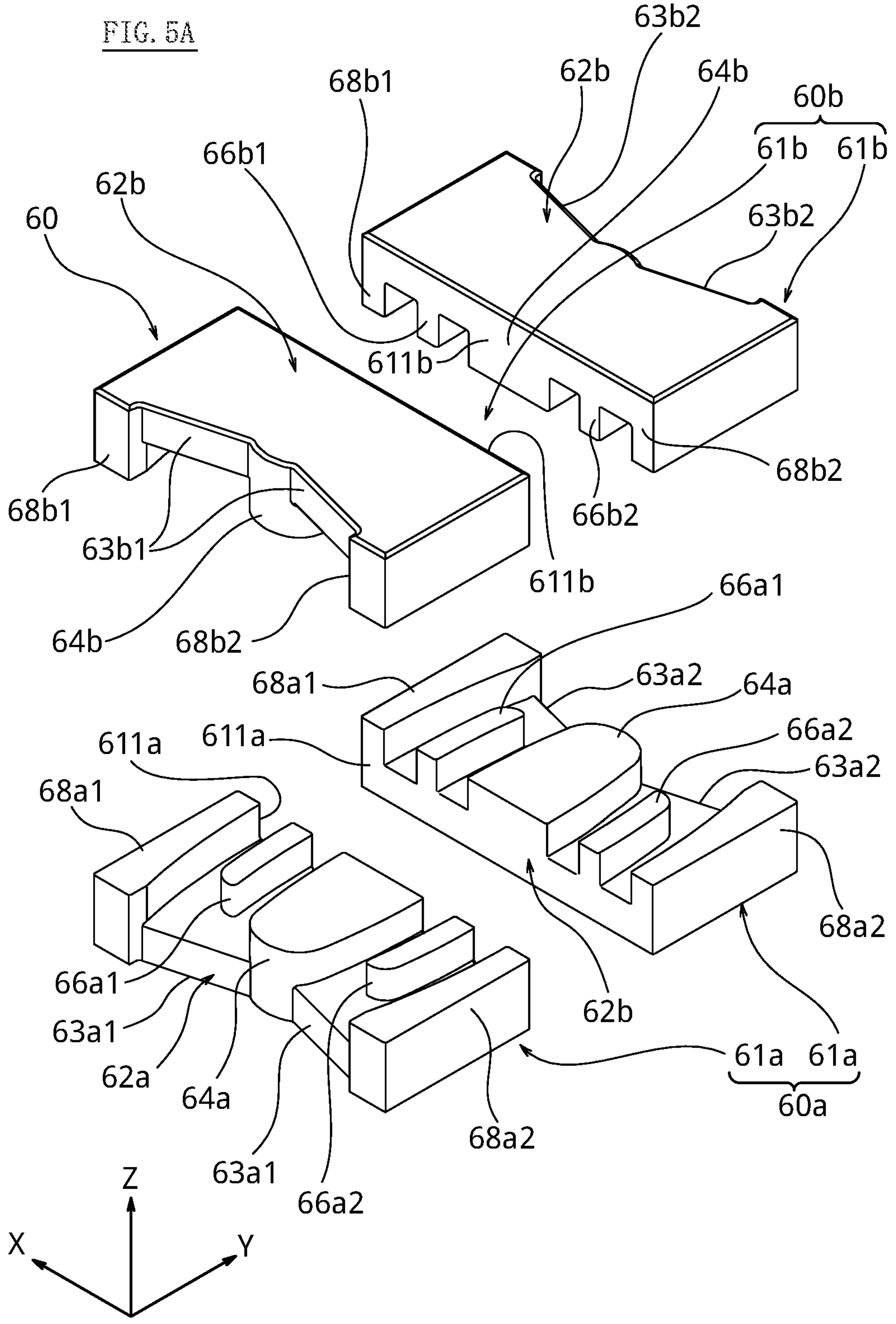
FIG. 5A is an explosive perspective figure showing a configuration of a core of the coil device according to FIG. 1.

The cores **60*a* and 60*b* have symmetrical structures along Z-axis. As shown in FIG. 5A, the core 60*a* is separable along a separation face 611*a* into two separated cores 61*a* and 61*a* of the same shapes. The core 60*b* is separable along a separation face 611*b* into two separated cores 61*b* and 61*b* of the same shapes. In the present embodiment, the separated cores 61*a*, 61*a*, 61*b*, and 61*b*** have the same shapes.

In below, the separated core **61*a* is described, and unless mentioned otherwise, the description of separated core 61*b* is omitted. The separated cores 61*a* and 61*a*** are symmetrical across a symmetric axis (Z-axis) perpendicular to X-axis.

As shown in FIG. 5A, the base part **62*a* of the separated core 61*a* extends along X-axis. At the outside of the center of the base part 62*a* in Y-axis direction, slanted faces 63*a*1 and 63*a*1** are formed which are slanting towards the center in X-axis direction.

At the base part **62*a*, the main inner leg section 64*a* protruding towards the upper side in Z-axis direction is formed. The main inner leg section 64***a* is arranged roughly on the center of the base part 62*a* in X-axis direction.

Also, a first outer leg section 68*a*1 and a second outer leg section 68*a*2 which are protruding to the upper side in Z-axis direction are formed on the base part 62*a*. The first outer leg section 68*a*1 is arranged at one end of the base part 62*a* in X-axis direction, and the second outer leg section 68*a*2 is arranged at the other end of the base part 62*a* in X-axis direction.

Also, a first sub-inner leg section 66*a*1 and a second sub-inner leg section 66*a*2, which are protruding to the upper side in Z-axis direction are formed on the base part 62*a*. The first sub-inner leg section 66*a*1 is arranged between the first outer leg section 68*a*1 and the main inner leg section 64*a*. The second sub-inner leg section 66*a*2 is arranged between the second outer leg section 68*a*2 and the main inner leg section 64*a*.

Figure 5B:
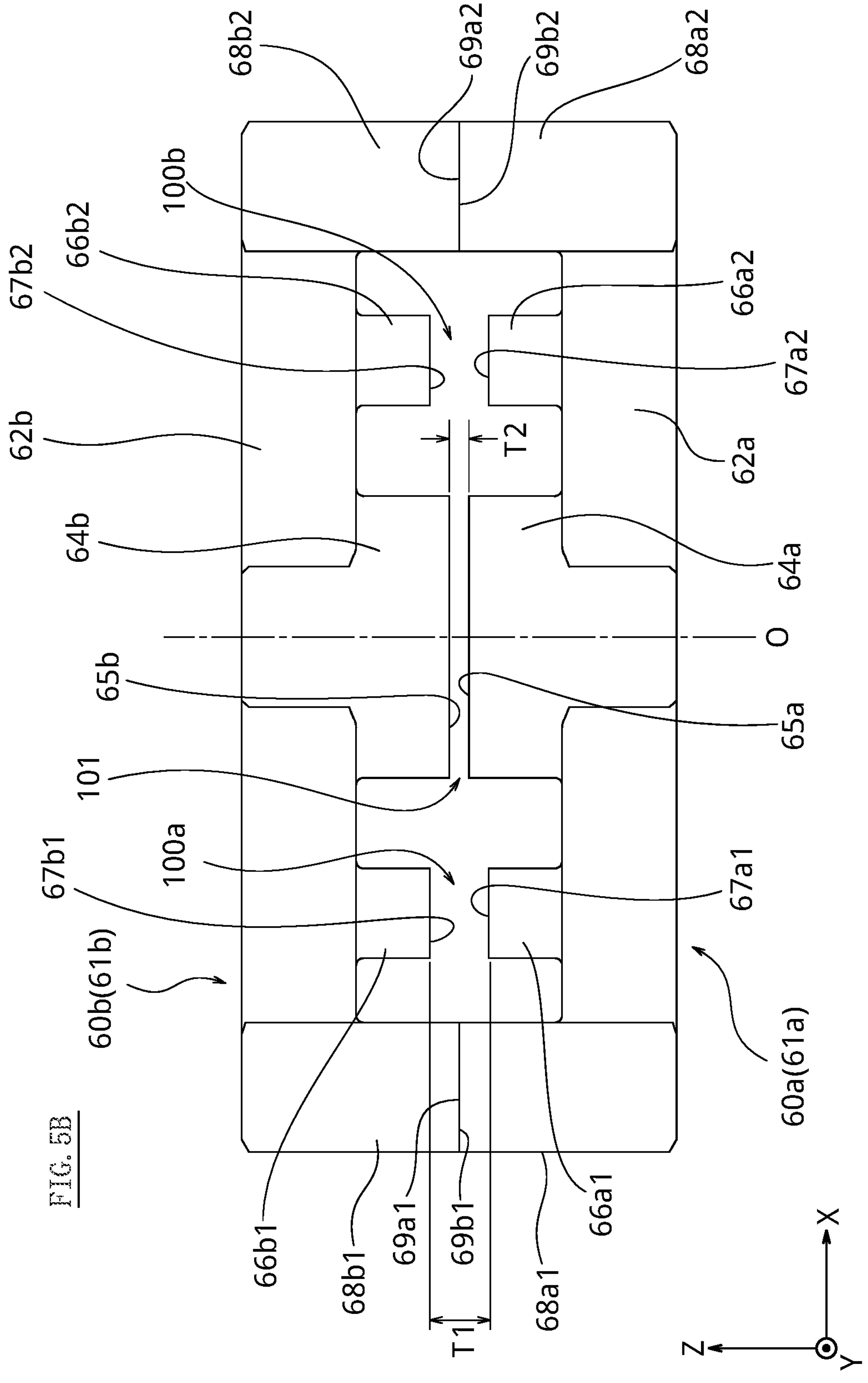
FIG. 5B is a front figure showing a configuration of the core of the coil device according to FIG. 1.

As shown in FIG. 1, the separated core 61*a* is arranged at the lower side of the bobbin 10 in Z-axis direction; and the separated core 61*b* is arranged at the lower side of the bobbin 10 in Z-axis direction. As shown in FIG. 5B, the end faces 69*a*1 and 69*b*1 of the first outer leg sections 68*a*1 and 68*b* 1 are in contact with each other in Z-axis direction; and the end faces 69*a*2 and 69*b*2 of the second outer leg sections 68*a*2 and 68*b*2 are in contact with each other in Z-axis direction.

As shown in FIG. 5B, a gap 100*a* (first gap) having a distance T1 is formed between an end face 67*a*1 in Z-axis of the first sub-inner leg section 66*a*1 and an end face 67*b*1 in Z-axis of the first sub-inner leg section 66*b*1. A gap 100*b* (first gap) having a distance T1 is formed between an end face 67*a*2 in Z-axis of the second sub-inner leg section 66*a*2 and an end face 67*b*2 in Z-axis of the second sub-inner leg section 66*b*2.

A gap 101 (second gap) having a distance T2 is formed between an end face 65*a* in Z-axis of the main inner leg section 64*a* and an end face 65*b* in Z-axis of the main inner leg section 64*b*. As shown in FIG. 5B, T1 is longer than T2.

Figure 3:
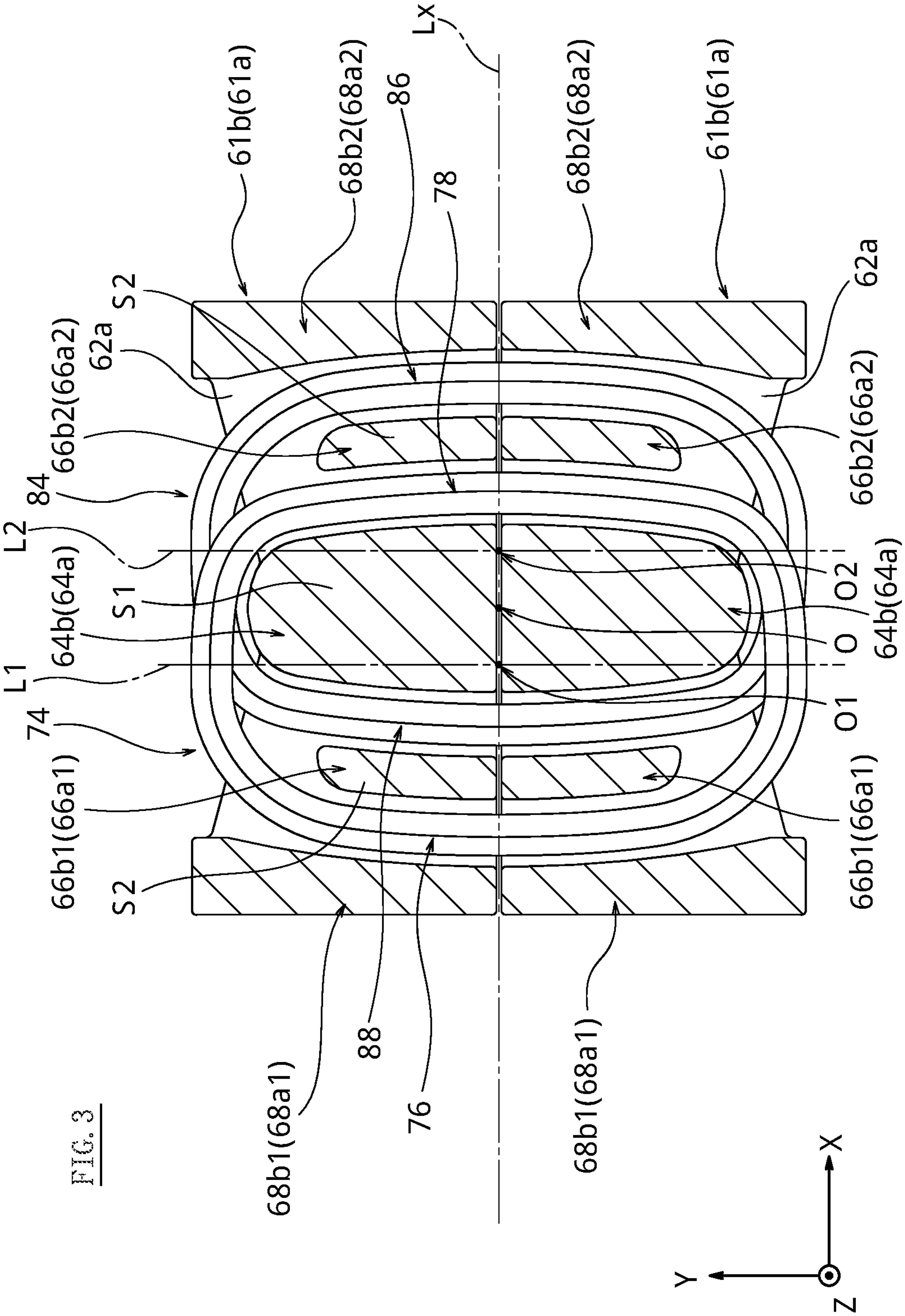
FIG. 3 is a plane figure showing a configuration of a part of the coil device according to FIG. 1.

In the present embodiment, a cross sectional area Si along Z-axis of the main inner leg section 64*a* shown in FIG. 3 is larger than a cross sectional area S2 along Z-axis direction of the first sub-inner leg section 66*a*1 and the second sub-inner leg section 66*a*2. Also, the cross sectional area S1 along Z-axis of the main inner leg section 64*a* is about the same as a cross sectional area S3 which is a total of the first outer leg section 68*a*1 and the second outer leg section 68*a*2 along Z-axis.

Figure 4A:
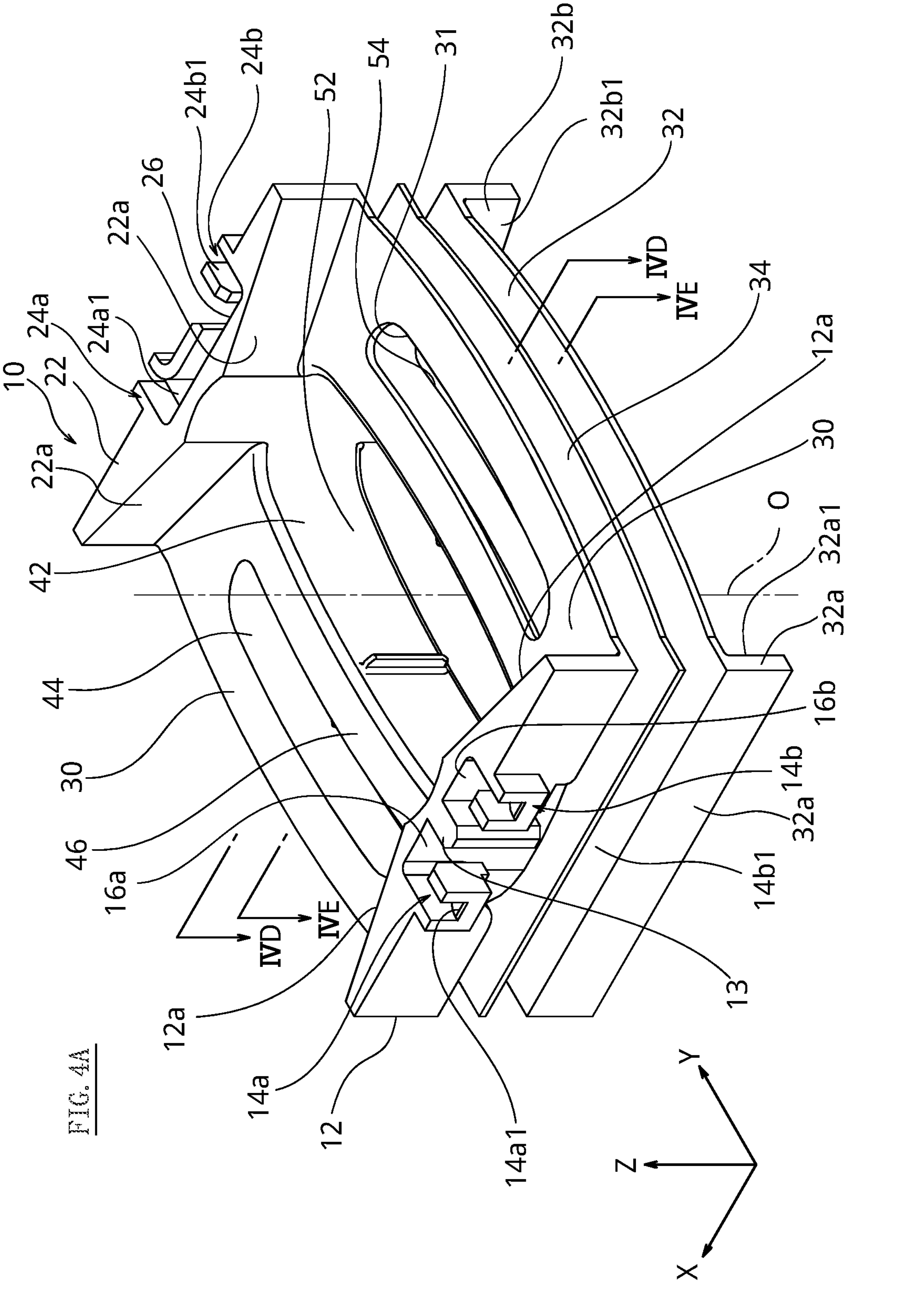
FIG. 4A is a schematic perspective figure showing a configuration of a bobbin of the coil device according to FIG. 1.
Figure 4B:
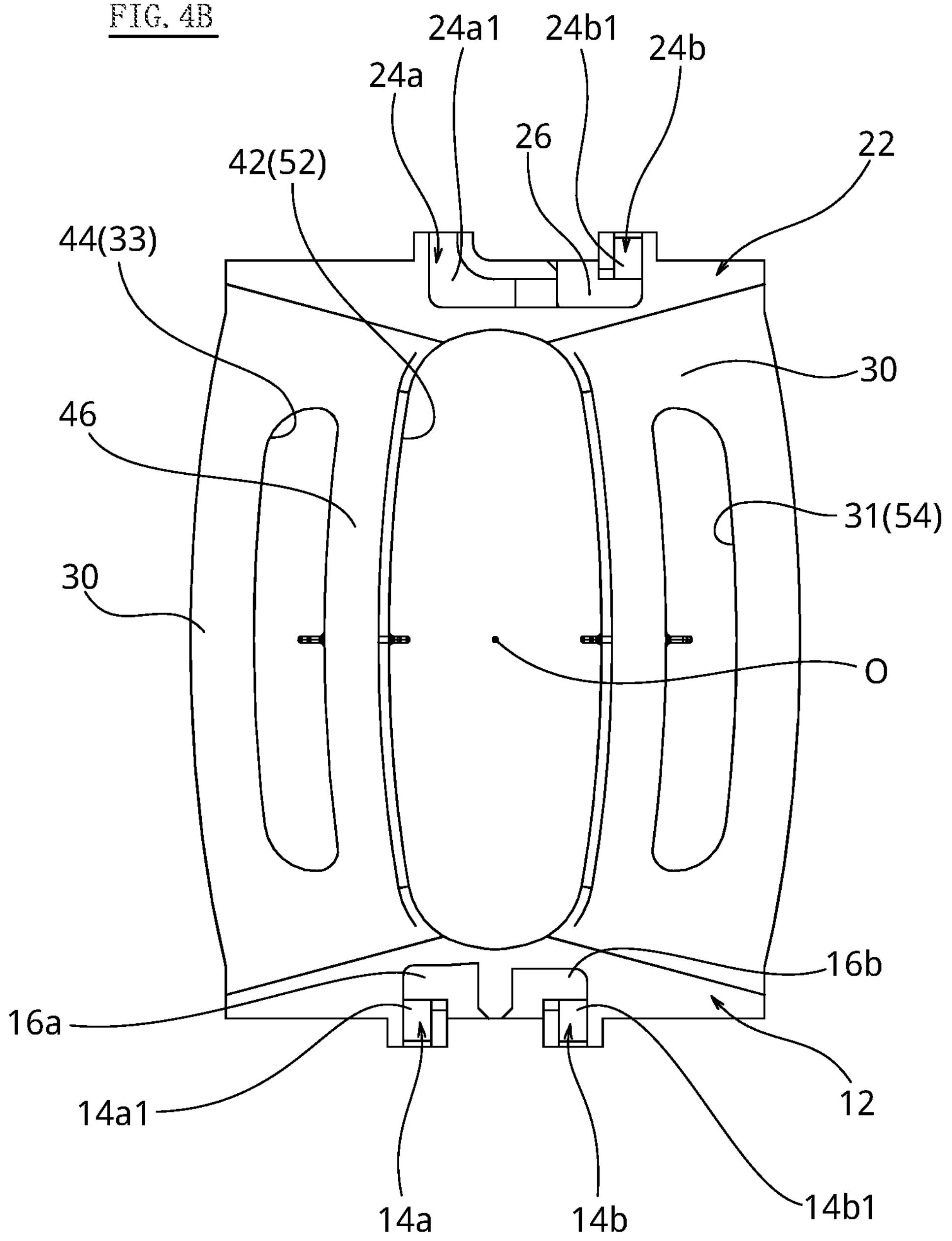
FIG. 4B is a plane figure showing a configuration of the bobbin according to FIG. A.
Figure 4C:
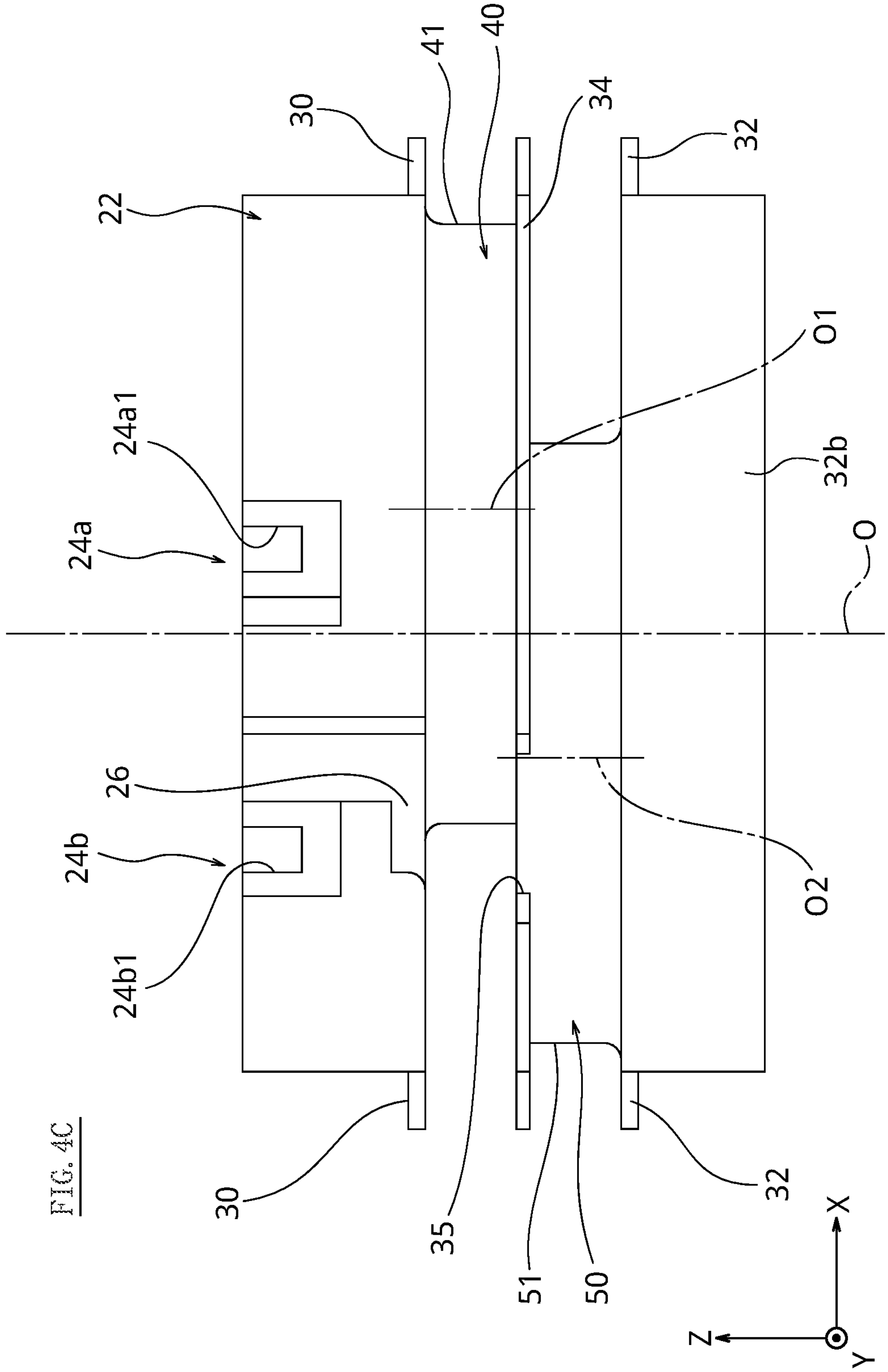
FIG. 4C is a rear figure showing a configuration of the bobbin according to FIG. 4A.

As shown in FIG. 4C, the bobbin 10 has a first end separation flange 30, a second end separation flange 32, and a winding part separation flange 34. A first winding part 40 which is the main body of the bobbin is formed between the first end separation flange 30 and the winding part separation flange 34. A second winding part 50 which is the main body of the bobbin is formed between the second end separation flange 32 and the winding part separation flange 34. The bobbin 10 may be constituted of, for example, plastics such as PPS, PET, PBT, LCP, Nylon, and so on, however it may be constituted of other insulating materials as well.

As shown in FIG. 4A, the first end separation flange 30 is arranged at the upper side in Z-axis direction of the first winding part 40. A first lead wire outlet board 12 is formed at the outside to the center of the first end separation flange 30 in Y-axis direction. The first lead wire outlet board has tapered faces 12*a* and 12*a* at the inside of the first lead wire outlet board 12 in Y-axis direction; and the tapered faces 12*a* and 12*a* are formed such that these are slanted towards the center in X-axis direction. The tapered faces 12*a* and 12*a* are formed in a way that these come in contact with slanted faces 63*b*1 and 63*b*1 which are formed at the outside to the center in Y-axis direction of the base part 62*b* of the separated core 60*b* which is one of the cores shown in FIG. 5A.

As shown in FIG. 4A, the first lead wire outlet board 12 has first wire passages 16*a* and 16*b* which extend along Z-axis; and the first lead wire outlet board 12 also has a separation protrusion 13 between the first wire passages 16*a* and 16*b*. The first lead wire outlet board 12 has first lead wire mounting parts 14*a* and 14*b* at the outside to the center in Y-axis direction of the first lead wire outlet board 12. The lead wire mounting parts 14*a* and 14*b* have first slots 14*a*1 and 14*b*1 which extend outward with respect to the center in Y-axis direction. The inner sides in Y-axis direction of the first slots 14*a*1 and 14*b*1 are connected to the upper sides of the first wire passages 16*a* and 16*b* in Z-axis direction.

As shown in FIG. 4A, the first end separation flange 30 has a second lead wire outlet board 22. The second lead wire outlet board 22 is arranged at outside to the center in Y-axis direction which is at the opposite side of the first lead wire outlet board 12.

The second lead wire outlet board 22 has tapered faces 22*a* and 22*a* at the inner side of the second lead wire outlet board 22 in Y-axis direction; and the tapered faces 22*a* and 22*a* are formed such that these are slanted towards the center in X-axis direction. The tapered faces 22*a* and 22*a* are formed in a way that these come in contact with slanted faces 63*b*2 and 63*b*2 which are at the outside to the center in Y-axis direction of the base part 62*b* of the separated core 60*b* as the other core shown in FIG. 5A.

As shown in FIG. 4A, the second lead wire outlet board 22 has a second passage 26 which extend along Z-axis. The second lead wire outlet board 22 has second lead wire mounting parts 24*a* and 24*b* at the outside to the center in Y-axis direction of the second lead wire outlet board 22.

As shown in FIG. 4B, the second lead wire mounting parts 24*a* and 24*b* have second slots 24*a*1 and 24*b*1. The second slot 24*a*1 has a L-shaped form having a first portion extending in X-axis direction and a second portion extending in Y-axis direction. The first portion of the second slot 24*a*1 connects to the second passage 26, and the second portion of the second slot 24*a*1 extends outwards with respect to the center in Y-axis direction. A first portion of the second slot 24*b*1 is connected to the upper side of the second passage 26 in Z-axis direction.

The first end separation flange 30 has a first insertion opening 31. The first insertion opening 31 corresponds to the shape of the second sub-inner leg sections 66*b*2 and 66*b*2 shown in FIG. 5A. The first insertion opening 31 is arranged so that it overlaps with a second sub-insertion opening 54. The second sub-inner leg section 66*b*2 is inserted to the first insertion opening 31.

As shown in FIG. 4C, the first winding part 40 extends along Z-axis direction. A center axis O1 of the first winding part 40 (a winding axis of the first coil part 74 shown in FIG. 2B) is arranged at the outside to a center axis O of the first main opening 42 along X-axis. The first coil part 74 shown in FIG. 2B is formed along a circumference 41 of the first winding part 40. Note that, the center axis O1 and the center axis O are parallel to Z-axis.

Figure 4D:
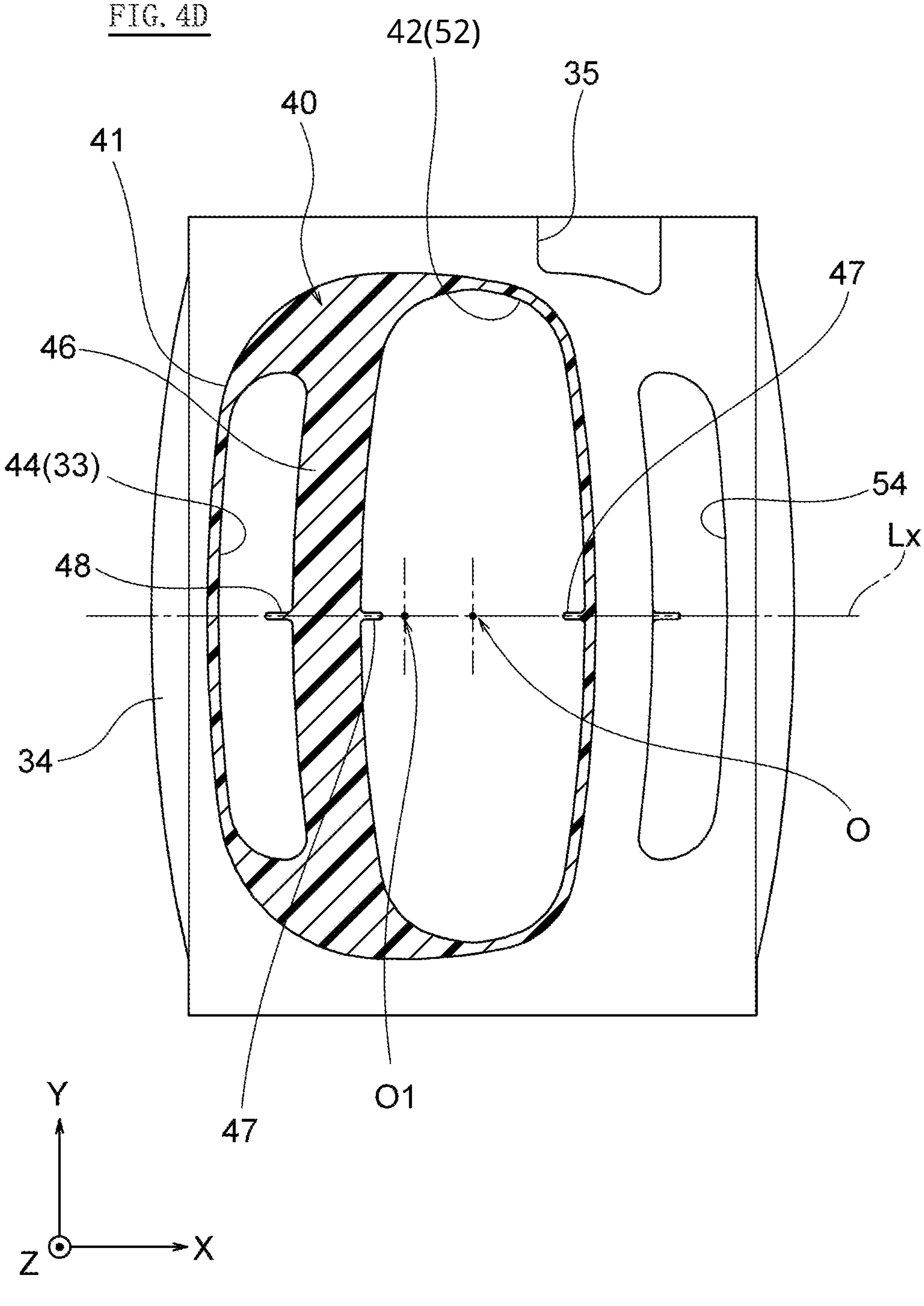
FIG. 4D is a cross section of the bobbin according to FIG. 4A along IVD-IVD line.

As shown in FIG. 4D, the first winding part 40 has the first main opening 42. As shown in FIG. 2C, the first main opening 42 and the second main opening 52 are connected. The first main opening 42 corresponds to the shape of the main inner leg sections 64*b* and 64*b* shown in FIG. 5A. As shown in FIG. 4D, the first main opening 42 has separation pieces 47 and 47. The separation pieces 47 and 47 contact with the separation face 611*b* of the main inner leg sections 64*b* and 64*b* shown in FIG. 5A, and separate the core 60*b* into the separated cores 61*b* and 61*b* along Y-axis direction.

As shown in FIG. 4D, the first winding part 40 has the first sub-opening 44. As shown in FIG. 2C, the first sub-opening 44 is connected to the winding part separation flange 34. The first sub-opening 44 corresponds to the shape of the first sub-inner leg sections 66*b*1 and 66*b*1 shown in FIG. 5A. As shown in FIG. 4D, the first sub-opening 44 has a separation piece 48. The separation piece 48 contacts with the separation face 611*b* of the first sub-inner leg sections 66*b*1 and 66*b*1 shown in FIG. 5A, and separates the core 60*b* into the separating cores 61*b* and 61*b* along Y-axis direction.

As shown in FIG. 4D, a first insulation wall 46 is formed between the first opening 42 and the first sub-opening 44. The first insulation wall 46 is arranged between the main inner leg sections 64*b* and 64*b* shown in FIG. 5A and the first sub-inner sections 66*b*1 and 66*b*1; thereby the main inner leg section and the first sub-inner leg section are insulated.

As shown in FIG. 4C, the bobbin 10 has the winding part separation flange 34 at the lower side of the winding part 40 in Z-axis direction. The winding part separation flange 34 has a notch 35 at a position which corresponds to the lower side in Z-axis direction of the second passage 26. That is, the notch 35 is arranged at the position off to the outside with respect to the center of X-axis direction. As shown in FIG. 2B, the second lead wire parts 82*a* and 82*b* are pulled out to the upper side in Z-axis direction from the second coil part 84 via the notch 35 and the second passage 26.

As shown in FIG. 4C, the second winding part 50 extends along Z-axis. A center axis O2 of the second winding part 50 (a winding axis of the second coil part 84 shown in FIG. 2B) is arranged at the outside to a center line 0 (the center axis O of the main opening 42 shown in FIG. 4A) of the second main opening 52 in X-axis direction. Note that, the center axis O2 is parallel to Z-axis.

In the present embodiment, the second winding part 50 has a shape which corresponds to the first winding part 40. Each of the first winding part 40 and the second winding part 50 are symmetrical across a symmetrical axis which is a center line Lx passing through the center axis O shown in FIG. 4D and FIG. 4E and also being parallel to X-axis.

Figure 4E:
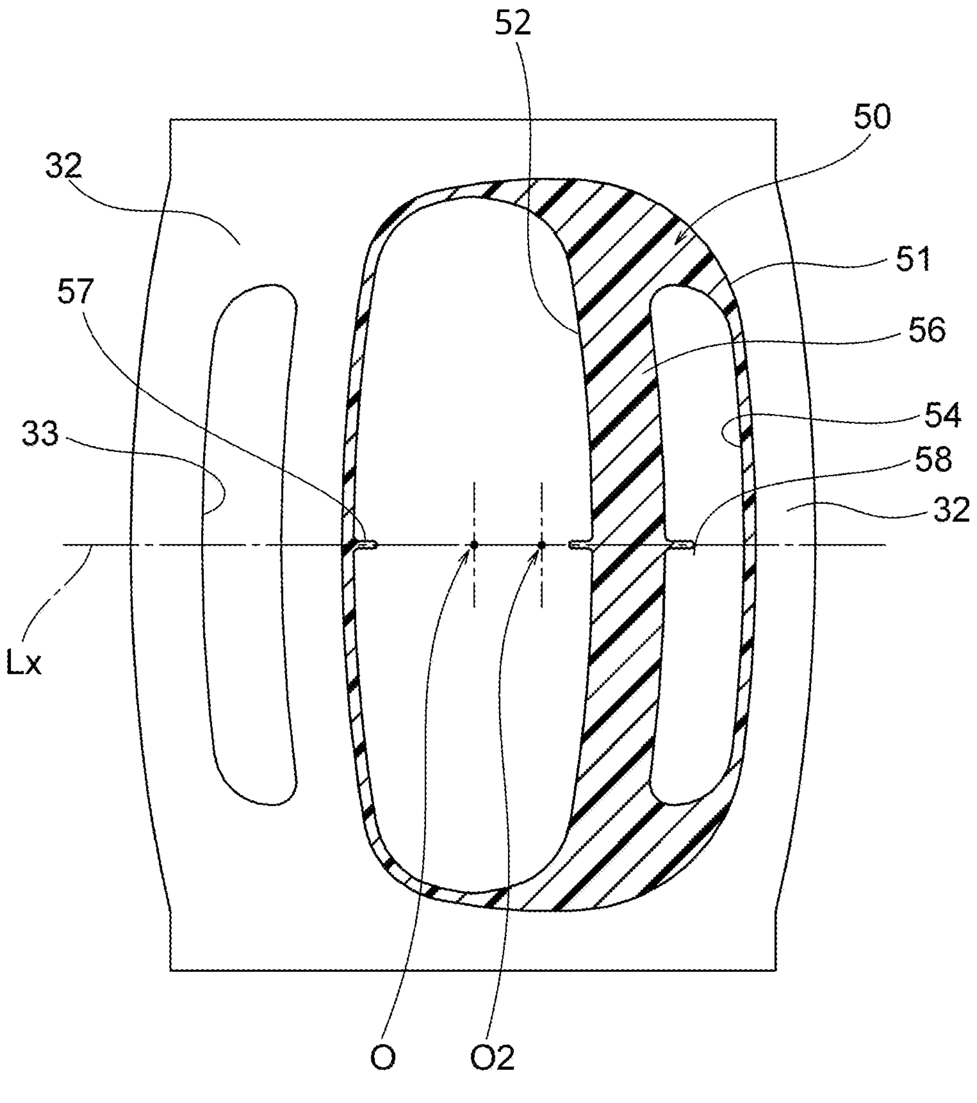
FIG. 4E is a cross section of the bobbin according to FIG. 4A along IVE-IVE line.

As shown in FIG. 4E, the second winding part 50 has the second main opening 52. As shown in FIG. 2C, the second main opening 52 corresponds to the shapes of the main inner leg sections 64*a* and 64*a*. As shown in FIG. 4E, the second main opening 52 has the separation pieces 57 and 57. The separation pieces 57 and 57 contact with the separation face 611*a* of the main inner leg sections 64*a* and 64*a* shown in FIG. 5A, and separates the core 60*a* into the separated cores 61*a* and 61*a* along Y-axis.

As shown in FIG. 4E, the second winding part 50 has the second sub-opening 54. As shown in FIG. 2C, the second sub-opening 54 is connected to the winding part separation flange 34. The second sub-opening 54 corresponds to the shapes of the second sub-inner leg sections 66*a*2 and 66*a*2 shown in FIG. 5A. As shown in FIG. 4E, the second sub-opening 54 has the separation piece 58. The separation piece 58 contacts with the separation face 611*a* of the second sub-inner leg sections 66*a*2 and 66*a*2 shown in FIG. 5A, and separates the core 60*a* into the separated cores 61*a* and 61*a* along Y-axis.

As shown in FIG. 4E, a second insulation wall is formed between the second main opening 52 and the second sub-opening 54. The second insulation wall 56 is arranged between the main inner leg sections 64*a* and 64*a* shown in FIG. 5A and the second sub-inner sections 66*a*1 and 66*a*1; thereby the main inner leg section and the first sub-inner leg section are insulated.

As shown in FIG. 4A, the second end separation flange 32 is arranged at the lower side of the second winding part 50 in Z-axis direction. The second end separation flange 32 has protruding parts 32*a* and 32*b* at both ends with respect to the center in Y-axis direction.

At the inside of the protruding parts 32*a* and 32*b* in Y-axis direction, tapered faces 32*a*1 and 32*b*1 are formed such that these are slanted towards the center in X-axis direction as similar to the tapered faces 12*a* and 12*a*. The tapered face 32*a*1 is formed in a way that it contacts with the slanted face 63*a*1 which is at the outside to the center of the base part 62*a* in Y-axis direction of the separated core 61*a* shown in FIG. 5A. The tapered face 32*a*2 is formed so that it contacts with the slanted face 63*a*2.

The second end separation flange 32 has a second insertion opening 33. The second insertion opening 33 corresponds to the shapes of the first sub-inner leg sections 66*a*1 and 66*a*1 shown in FIG. 5A. The second insertion opening 33 is arranged so that it overlaps with the first sub-opening 44. The first sub-inner leg section 66*a*1 is inserted to the second insertion opening 33.

Figure 2A:
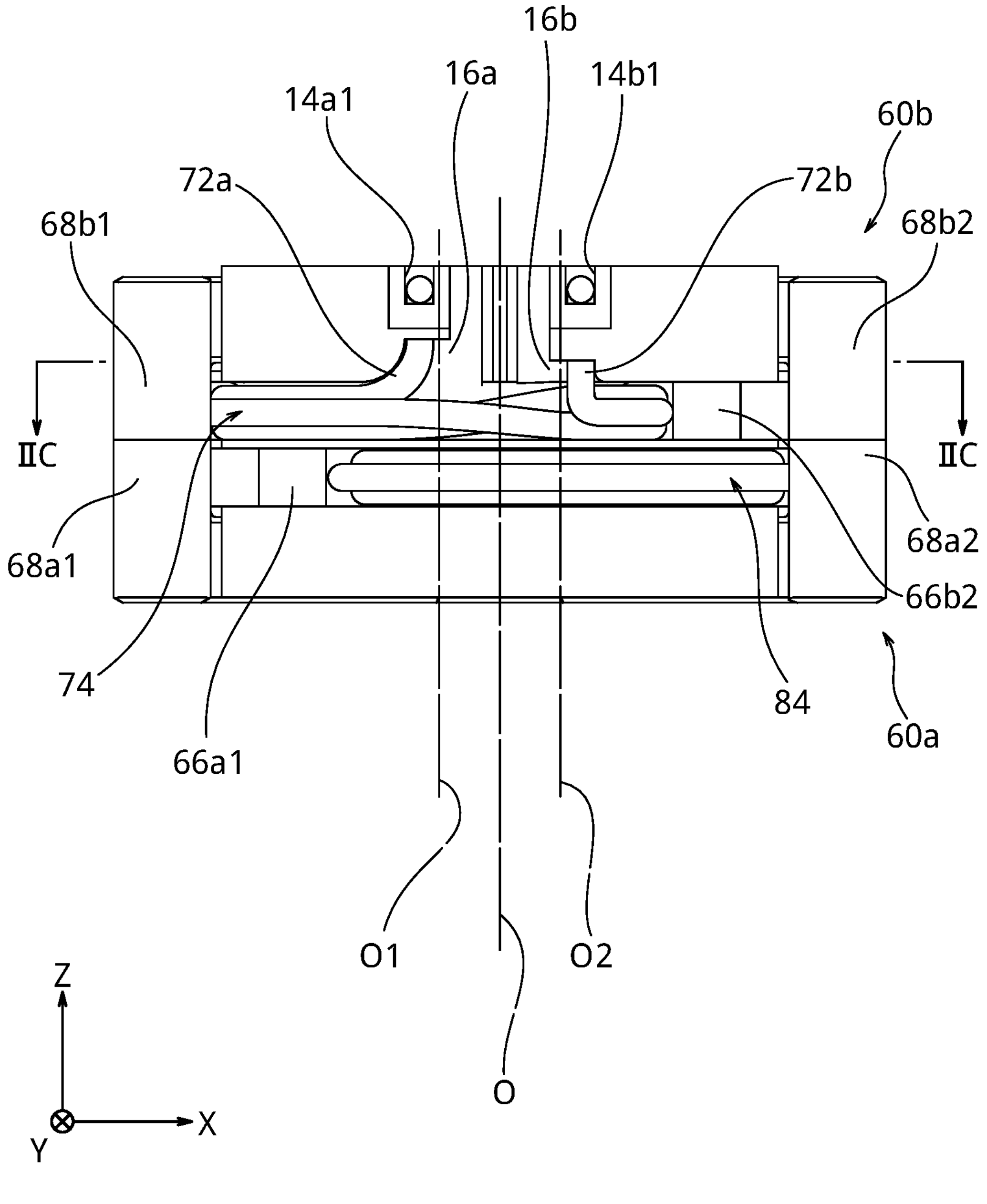
FIG. 2A is a schematic figure of a part of the coil device according to FIG. 1 from a different angle.
Figure 2B:
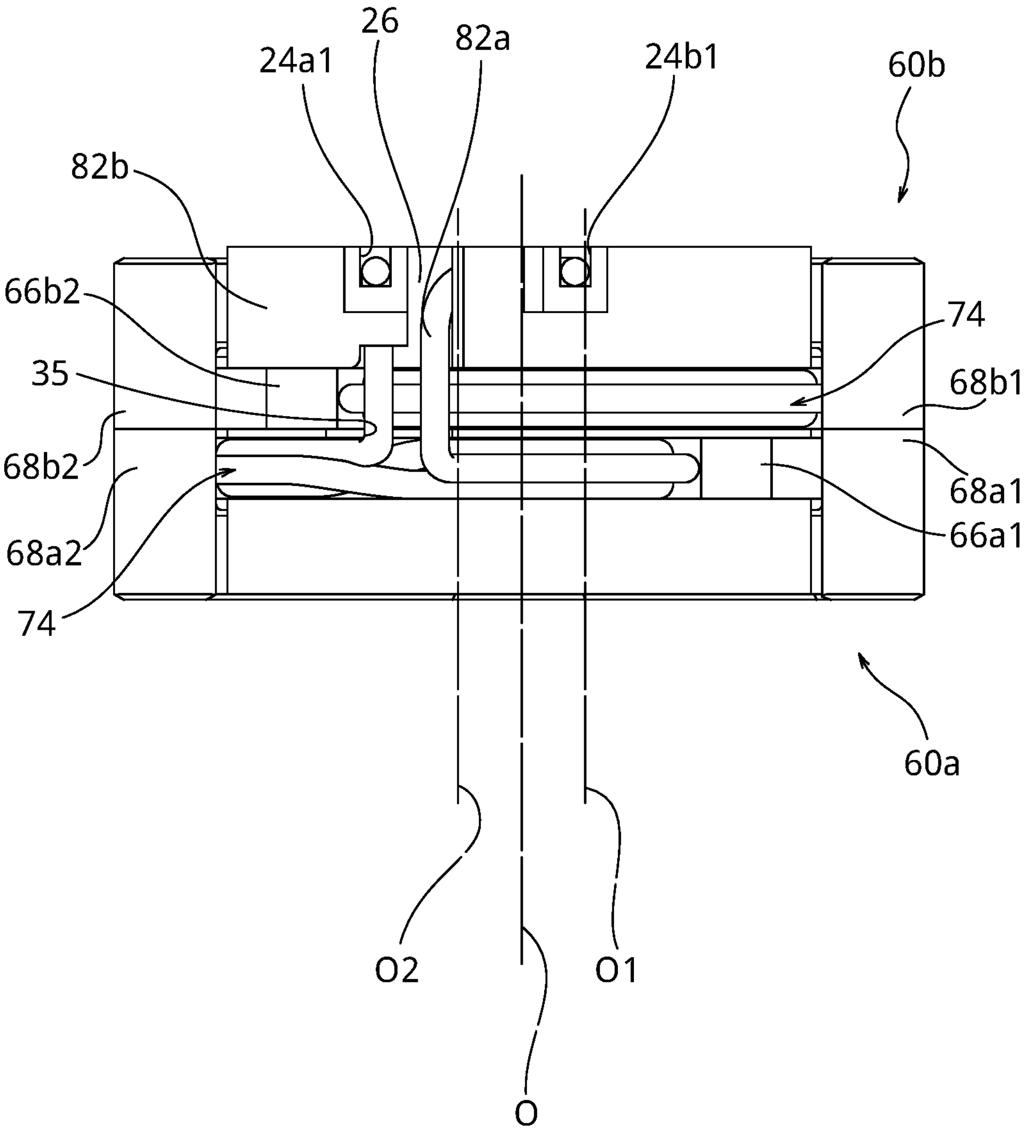
FIG. 2B is a schematic figure of a part of the coil device according to FIG. 1 from further different angle.
Figure 2C:
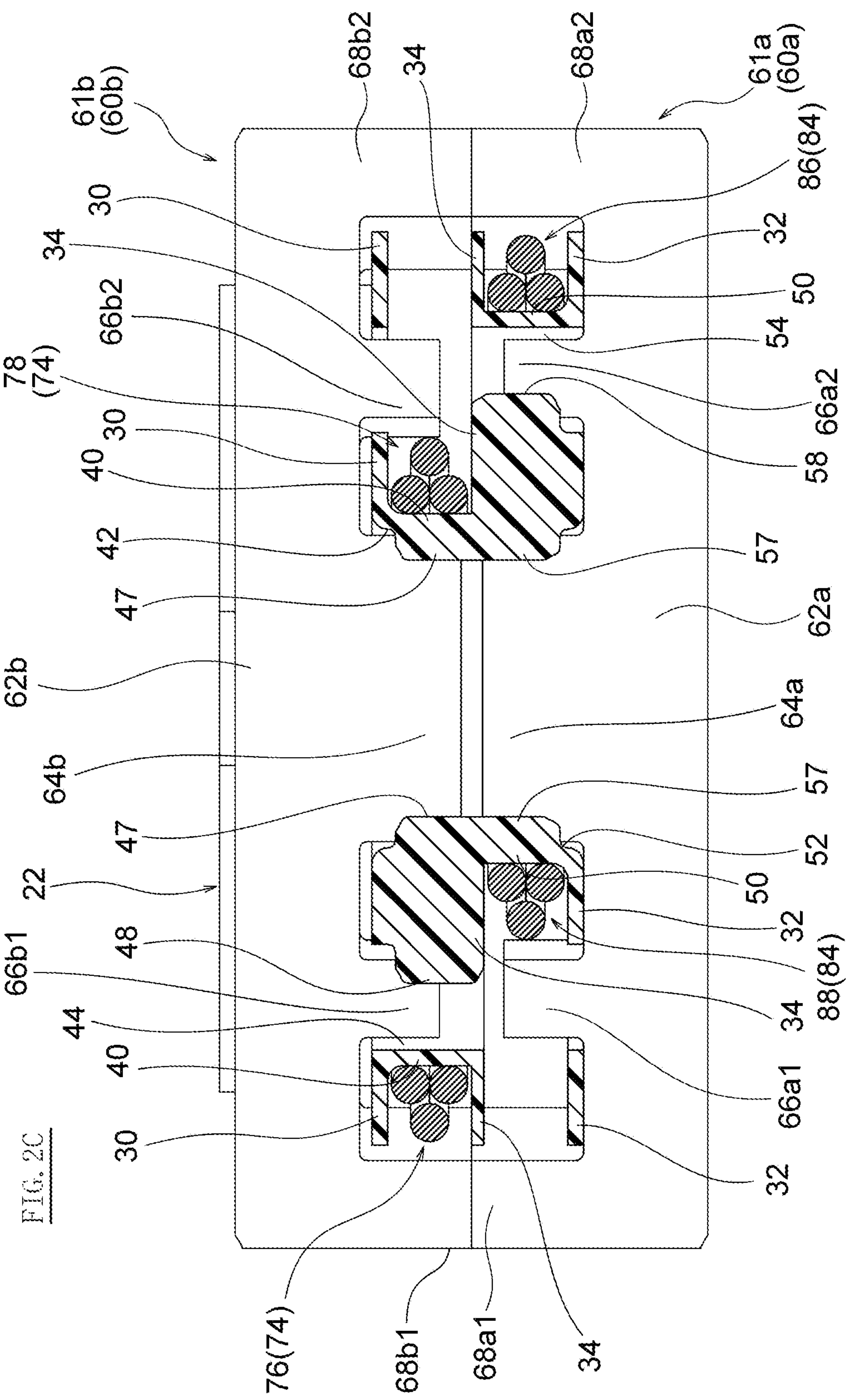
FIG. 2C is a cross section figure along IIC-IIC line shown in FIG. 2A.

As shown in FIG. 2A and FIG. 2B, the first wire 70 and the second wire 80 are wound around the bobbin 10. The wires 70 and 80 may be made of the same or different materials. An outer diameter of each wire 70 and 80 is not particularly limited, and preferably it may be within a range of 1.0 to 4.0 mm. Also, an insulation coating may be formed to each of the wires 70 and 80.

The first wire 70 has the first coil part 74 which is wound around the first winding part 40 of the bobbin 10; and the second wire 80 has the second coil part 84 which is wound around the second winding part 50 of the bobbin 10. As shown in FIG. 2C, the first coil part 74 is arranged between the first end separation flange 30 and the winding part separation flange 34. The second coil part 84 is arranged between the second end separation flange 32 and the winding part separation flange 34.

As shown in FIG. 2A and FIG. 2B, the winding axis O1 of the first coil part 74 is shifted to one side along X-axis direction from the center line 0 of the transformer (the center axis O of the first main opening 42 and the second main opening 52 shown in FIG. 4A). Also, the winding axis O2 of the second coil part 84 is shifted to the opposite side of the winding axis O1 of the first coil part 74 in X-axis direction with respect to the center line 0. The winding axis O1 of the first coil part 74 and the winding axis O2 of the second coil part 84 are parallel to Z-axis direction.

As shown in FIG. 3, the first coil part 74 has a first coil outer part 76 arranged at the outside of the center in X-axis direction with respect to a center line L1 passing through the winding axis O1 and running along Y-axis. The first coil part 74 also has a first inner side part 78 which is arranged at the opposite side in X-axis direction across the first coil outer part 76.

As shown in FIG. 2C, the first coil outer part 76 runs between the first outer leg section 68*b* 1 and the first sub-inner leg section 66*b* 1. Also, the first coil inner side part 78 runs between the main inner leg section 64*b* and the second sub-inner leg section 66*b*2.

Figure 6:
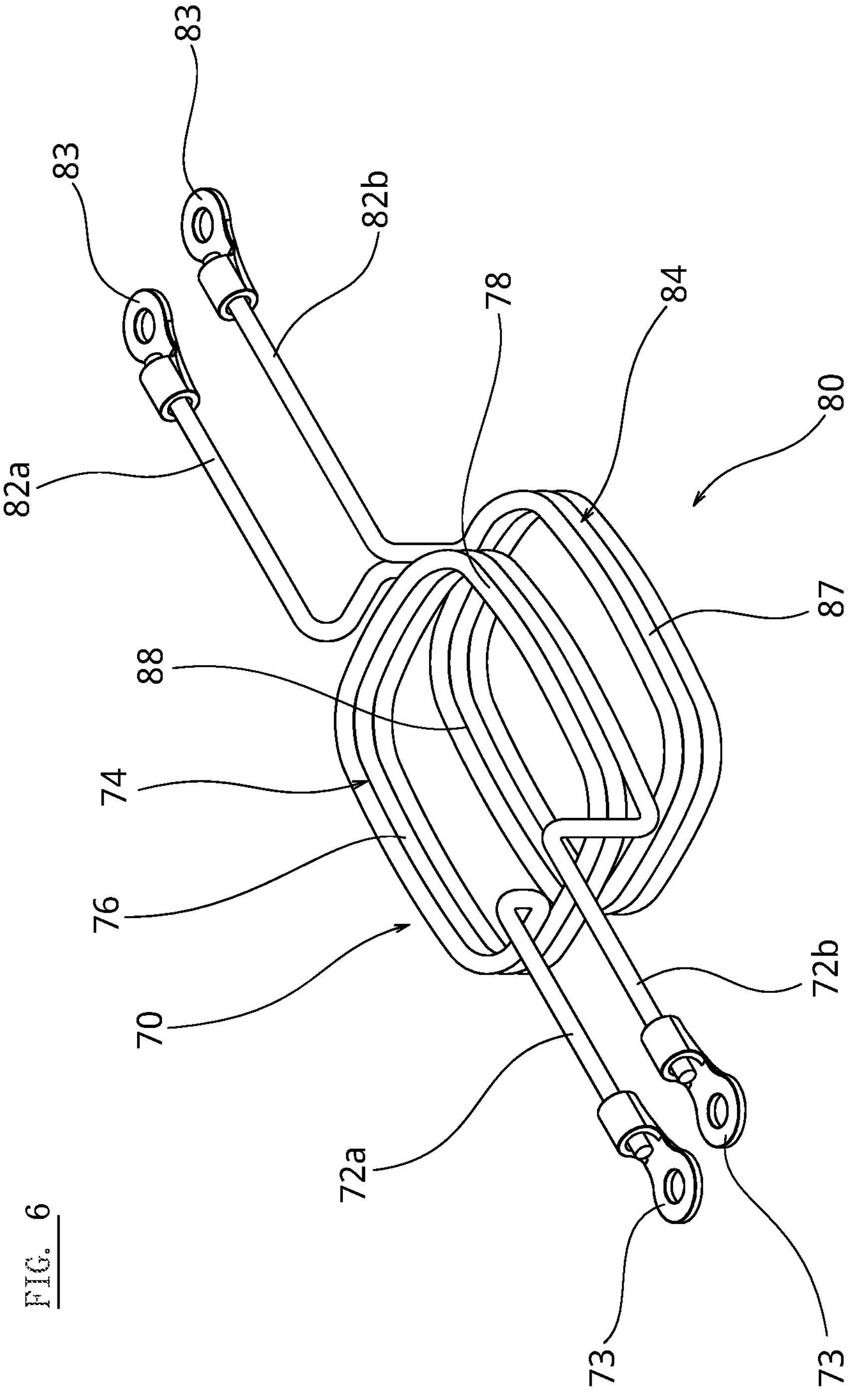
FIG. 6 is a schematic perspective figure showing a configuration of a wire of the coil device according to FIG. 1.

As shown in FIG. 6, the first wire 70 has first lead wire parts 72*a* and 72*b* which extends from the first coil part 74. A connection terminal 73 constituted of a metal terminal is electrically connected to each end of the first lead wire parts 72*a* and 72*b* using solder and so on.

As shown in FIG. 2A, the first lead wire part 72*a* extends to the upper side in Z-axis direction towards the first passage 16*a*. The first lead wire part 72*a* passes through the first slot 14*a*1, and extends outwards in Y-axis direction with respect to the center.

As shown in FIG. 2A, the first lead wire part 72*b* extends to the upper side in Z-axis direction towards the first passage 16*b*. The first lead wire part 72*b* passes through the first slot 14*b*1 and extends outwards in Y-axis direction with respect to the center.

As shown in FIG. 3, the second coil part 84 has a second coil outer part 86 arranged at the outside in X-axis direction than a center line L2 passing through the winding axis O2 and running along Y-axis. The second coil part 84 also has a second inner side part 88 which is arranged at the opposite side in X-axis direction across the second coil outer part 86.

As shown in FIG. 2C, the second coil outer part 86 runs between the second outer leg section 68*a*2 and the second sub-inner leg section 66*a*2. Also, the second coil inner side part 88 runs between the main inner leg section 64*a* and the first sub-inner leg section 66*a*1.

As shown in FIG. 6, the second wire 80 has second lead wire parts 82*a* and 82*b* which extend from the second coil part 84. A connection terminal 83 constituted of a metal terminal is electrically connected to each end of the second lead wire parts 82*a* and 82*b* using solder and so on.

As shown in FIG. 2B, the second lead parts 82*a* and 82*b* pass through the notch 35, and extend to the upper side in Z-axis direction towards the second passage 26. The second lead wire part 82*a* passes through the first portion of the second slot 24*a*1 and the second portion of the second slot 24*a*1 shown in FIG. 4B from the second passage 26, and extends outwards with respect to the center in Y-axis direction. By configuring as such, the second lead wire part 82*a* is pulled out while kept insulated from the first coil part 74.

As shown in FIG. 2B, the second lead wire part 82*b* extends to the upper side in Z-axis direction towards the second passage 26*b*. The second lead wire part 82*b* passes through the second slot 24*b*1, and extends outwards in Y-axis direction with respect to the center.

In the present embodiment, as shown in FIG. 2C, the first coil part 74 is wound around the first winding part 40, and the second coil part 84 is wound around the second winding part 50. The first winding part 40 and the second winding part 50 are separated by the winding part separation flange 34, and the first coil part 74 and the second coil part 84 are securely insulated against each other.

The first winding part 40 has the first main opening 42 where the main inner leg section 64*b* is arranged, and the first sub-opening 44 where the first sub-inner leg section 66*b*1 is arranged. Therefore, the main inner leg section 64*b* and the first sub-inner leg section 66*b*1 are arranged at the inside of the first coil part 74, and the first coil part 74 and the core 60*b* are securely insulated against each other.

The second winding part 50 has the second main opening 52 where the main inner leg section 64*a* is arranged, and the second sub-opening 54 where the second sub-inner leg section are arranged. Therefore, the main inner leg section 64*a* and the second sub-inner leg section 66*a*2 are arranged at the inside of the second coil part 84, and the second coil part 84 and the core 60*a* are securely insulated against each other.

The second sub-inner leg section 66*b*2 of the core 60*b* is arranged between the second outer leg section 68*b*2 of the core 60*b* and the first coil inner side part 78 of the first coil part 74. That is, the second sub-inner leg section 66*b*2 is arranged at the outside of the first coil part 74. Also, the first sub-inner leg section 66*a*1 of the core 60*a* is arranged between the first outer leg section 68*a*1 of the core 60*a* and the second coil inner side part 88 of the second coil part 84. That is, the first sub-inner leg section 66*a*1 is arranged at the outside of the second coil part 84.

By arranging the coils and the sub-inner leg sections as such, even without taking sufficient space between the coils, the leakage flux is generated to the sub-inner leg sections, the leakage flux can be secured. Thus, a choke coil can be omitted, which enables to achieve a compact transformer 1. Also, the transformer 1 has suppressed AC resistance, and a low copper loss is achieved.

In the present embodiment, as shown in FIG. 5A, the core 60*a* can be separated into the separated cores 61*a* and 61*a*. The separated cores 61*a* and 61*a* have symmetrical structures. The core 60*b* can be separated into the separated cores 61*b* and 61*b*, and the separated cores 61*b* and 61*b* have symmetrical structures. By configuring as such, the core can be easily installed to the bobbin.

Also, the separated core 61*a* and the separated core 61*b* have symmetrical structures, and the separated core 61*a* and the separated core 61*b* have symmetrical structures along Z-axis. Therefore, even if the separated cores are swapped, these function the same way, and a production cost can be reduced.

As shown in FIG. 3, the present embodiment is a horizontal leakage transformer in which the winding axis O1 of the first coil part 74 and the winding axis O2 of the second coil part 84 are aligned by shifting along X-axis; and as shown in FIG. 4D and FIG. 4E, the first winding art 40 and the second winding part 50 have the same sizes and corresponding shapes. Thus, as shown in FIG. 2C, by setting the ratio of the number of turns of wires of the first coil part 74 and the second coil part 84 to 1:1, the first coil part 74 and the second coil part 84 can have about the same inductance. Such transformer 1 can prevent switching loss.

In the present embodiment, as shown in FIG. 2C, the first coil part 74 and the second coil part 84 are held between the base part 62*a* arranged at the lower side of Z-axis direction and extending along X-axis direction and the base part 62*b* arranged at the upper side of Z-axis direction and extending along X-axis direction. Also, the first coil part 74 and the second coil part 84 are held from the both sides in X-axis direction by the first outer leg section and the second outer leg section which are extending in Z-axis direction. By configuring as such, the first coil part 74 and the second coil part 84 can be placed between the cores 60*a* and 60*b*. Thereby, a compact transformer having substantially rectangular parallelepiped outer shape can be produced.

In the present embodiment, as shown in FIG. 5B, the gap 100*a* of distance T1 is formed between the first sub-inner leg sections 66*a*1 and 66*b*1; and the gap 100*b* of distance T1 is formed between the second sub-inner leg sections 66*a*2 and 66*b*2. Also, the gap 101 of distance T2 is formed between the main inner leg section 64*a* and the main inner leg section 64*b*. Also, the distance T1 is longer than the distance T2. The transformer 1 can adjust the leakage flux using these gaps, and these gaps allows preventing the chipping and breaking of the leg sections. Note that, the distances of these gaps can be changed if needed, and also even in case these gaps are not provided, the leakage transformer can still function.

Note that, the present invention is not limited to the above-mentioned embodiment, and it can be variously modified within the scope of the present invention.

As shown in FIG. 5A, the above-mentioned embodiment has the cores 60*a* and 60*b* which are E-shaped cores having 5 leg sections, however, either one of the cores may be an I-shaped core which does not have leg sections. In such case, the leg sections of the E-shaped core contact with the I-shaped core.

NUMERICAL REFERENCES

1 . . . Transformer
10 . . . Bobbin
12 . . . First lead wire outlet board
13 . . . Separation protrusion
14*a*,14*b* . . . First lead wire mounting part
14*a*1,14*b*1 . . . First slot
16*a*,16*b* . . . First passage
22 . . . Second lead wire outlet board
24*a*,24*b* . . . Second lead wire mounting part
24*a*1,24*b*1 . . . Second slot
26 . . . Second passage
30 . . . First end separation flange
31 . . . First insertion opening
32 . . . Second end separation flange
32*a*,32*b* . . . Protruding part
33 . . . Second insertion opening
34 . . . Winding part separation flange
35 . . . Notch
40 . . . First winding part
41 . . . Circumference
42 . . . First main opening
44 . . . First sub-opening
46 . . . First insulation wall
47,48 . . . Separation piece
50 . . . Second winding part
51 . . . Circumference
52 . . . Second main opening
54 . . . Second sub-opening
56 . . . Second insulation wall
57,58 . . . Separation piece
60*a*,60*b* . . . Core
61*a*,61*b* . . . Separated core
611*a*,611*b* . . . Separation face
62*a* . . . Base part (Core first portion)
62*b* . . . Base part (Core second portion)
63*a*1,63*a*2,63*b*1,63*b*2 . . . Slanted face
64*a*,64*b* . . . Main inner leg section
65*a*,65*b* . . . End face
66*a*1,66*b*1 . . . First sub-inner leg section
66*a*2,66*b*2 . . . Second sub-inner leg section
67*a*1,67*b*1 . . . End face
67*a*2,67*b*2 . . . End face
68*a*1,68*b*1 . . . First outer leg section
68*a*2,68*b*2 . . . Second outer leg section
69*a*1,69*b*1 . . . End face
69*a*2,69*b*2 . . . End face
70 . . . First wire
72*a*,72*b* . . . First lead wire part
73 . . . Connection terminal
74 . . . First coil part
76 . . . First coil outer part
78 . . . First coil inner part
80 . . . Second wire
82*a*,82*b* . . . Second lead wire part
83 . . . Connection terminal
84 . . . Second coil part
86 . . . Second coil outer part
88 . . . Second coil inner part
90 . . . Case
91 . . . Fixing part
92 . . . Base board
100*a*,100*b* . . . Gap (first gap)
101 . . . Gap (second gap)

What is claimed is:

1. A coil device comprising
a bobbin,
a first wire having a first coil part wound around the bobbin,
a second wire having a second coil part wound around the bobbin, and
a core installed to the bobbin, wherein;
the core comprises
a base part extending in a first axis direction,
a main inner leg section arranged roughly on a center of the base part in the first axis direction,
a first sub-inner leg section on the base part arranged at one side to the main inner leg section in the first axis direction, and
a second sub-inner leg section on the base part arranged at an other side to the main inner leg section in the first axis direction; in which
the main inner leg section is arranged at an inside of the first coil part and the second coil part,
the first sub-inner leg section is arranged at the inside of the first coil part and an outside of the second coil part,
the second sub-inner leg section is arranged at the inside of the second coil part and at an outside of the first coil part,
the first coil part and the second coil part are arranged separately along a direction of a winding axis,
the bobbin includes a first winding part to which the first coil part is wound around, a second winding part to which the second coil part is wound around, and a winding part separation flange separating the first winding part and the second winding part,
the first winding part is provided with a first main opening for arranging the main inner leg section and a first sub-opening for arranging the first sub-inner leg section,
the second winding part is provided with a second main opening for arranging the main inner leg section and a second sub-opening for arranging the second sub-inner leg section,
the first main opening and the second main opening are continuous along a center axis,
the first sub-opening is arranged at one side in the first axis direction with respect to the first main opening or the second main opening, and
the second sub-opening is arranged at an other side in the first axis direction with respect to the first main opening or the second main opening.

2. The coil device according to claim 1, wherein
the core comprises
a first outer leg section and a second outer leg section arranged on the base part, in which
the first sub-inner leg section is arranged between the first outer leg section and the main inner leg section,
the second sub-inner leg section is arranged between the second outer leg section and the main inner leg section,
the first outer leg section is arranged at outside of the first coil part, and
the second outer leg section is arranged at outside of the second coil part.

3. The coil device according to claim 2, wherein
a cross sectional area of the main inner leg section is about the same as a total of a cross sectional area of the first outer leg section and a cross sectional area of the second outer leg section.

4. The coil device according to claim 1, wherein
a cross sectional area of the main inner leg section is larger than a cross sectional area of the first sub-inner leg section.

5. The coil device according to claim 1, wherein
the core is symmetrical across a symmetric axis perpendicular to the first axis direction.

6. The coil device according to claim 1, wherein
the core includes a core first portion at least including a first base part which is one part of the base part, and a core second portion at least including a second base part which is an other part of the base part and is approximately being parallel to the first base part, and
the first coil part and the second coil part are held along a direction of a winding axis of the first coil part between the core first portion and the core second portion.

7. The coil device according to claim 6, wherein the first sub-inner leg section has a first gap.

8. The coil device according to claim 7, wherein the main inner leg section has a second gap, and a length of the first gap is longer than a length of the second gap.

9. The coil device according to claim 6, wherein the core first portion and the core second portion have symmetrical structures along the winding axis of the first coil part.

10. The coil device according to claim 1, wherein the core is separable along a second axis perpendicular to the first axis and the winding axis of the first coil part.

11. The coil device according to claim 1, wherein the first sub-inner leg section has a first gap, and the main inner leg section has a second gap.

12. The coil device according to claim 11, wherein a distance of the first gap is larger than a distance of the second gap.

13. The coil device according to claim 11, wherein the distance of the second gap is equal to or larger than the distance of the first gap.

14. The coil device according to claim 1, wherein the first sub-inner leg section has a first gap, and the main inner leg section does not have a second gap.

15. The coil device according to claim 1, wherein the first sub-inner leg section does not have a first gap, and the main inner leg section has a second gap.

* * * * *